Patented Mar. 30, 1926.

1,579,033

UNITED STATES PATENT OFFICE.

JOSÉ FERRER RIERA, OF BARCELONA, SPAIN.

PROCESS FOR THE MANUFACTURE OF SYNTHETIC EMERALD STONES.

No Drawing.   Application filed October 4, 1924.   Serial No. 741,779.

*To all whom it may concern:*

Be it known that I, JOSÉ FERRER RIERA, a subject of the King of Spain, residing at 94 Claris, Barcelona, Spain, have invented certain new and useful Process for the Manufacture of Synthetic Emerald Stones, of which the following is a specification.

The present invention has for its object a process for the production of emerald stones by a synthetic method such that the said process, results in a product which, when suitably cut and polished by the art of lapidary imitates in perfect manner emeralds that have a natural mineral origin.

The process in question is based on the operation of melting a mixture of silica, ground or pulverized and tinted with green or greenish colouring matter, with hydrate or anhydrous oxide of glucinium and with alumina also hydrated or anhydrous. There is added to this mixture substances to serve as flux and fusion is then effected in suitable furnaces, such as oxy-hydrogen, oxy-acetylene or electrical furnaces.

The following is an example of the manner of carrying out the invention:

90 grammes of rock crystal are heated nearly to red heat and subjected to rapid cooling by being plunged into cold water in order that by this means the rock crystal may become more brittle. It is then triturated and pulverized.

The rock crystal thus triturated is submitted to the action of a bath consisting of a quantity of distilled water which contains in solution 50% nitrate of copper and a less quantity of nitrate of uranium. This bath may be more or less concentrated or may be employed in more or less considerable volume according to the intensity or colouration which it is desired to obtain.

There is added to the rock crystal hereinbefore mentioned 20 grammes of hydrated alumina in order thus to produce the same composition as that of the natural emerald.

20 grammes of hydrated or anhydrous oxide of glucinium are added and the composition is then ready to be melted. There is added to this composition in the character of flux 30 grammes of carbonate of lithia or caustic lithia, 15 grammes of fused boracic acid powdered, and 4 grammes of sodium borate fused and pulverized.

The prepared mixture is melted in a crucible by means of an oxy-hydrogen or electric furnace at a temperature of 1,600 to 1,900° C., and the product of fusion after cooling is divided into pieces of the size corresponding to the desired size of the stones to be obtained, and the pieces are afterwards heated in a muffle to a temperature of from 600° to 800° C., until they become softened to a degree which will permit them to be moulded. This operation is preferably effected with the aid of tongs having arms sufficiently large to be able to easily effect the moulding and compression of the substance to give to the pieces the desired forms. By this treatment the product acquires a particular appearance which renders it incomparably more precious both as regards its texture and its colour, corresponding more nearly to those of the natural emerald, for the rest the product gains in density which nearly equals that of the emerald. This treatment takes a total of one half to three quarters of an hour.

This product once it has been treated by the methods of lapidary by cutting and polishing acquires an appearance of emeralds of natural origin.

I claim:—

A process of manufacture of synthetic emerald stones consisting in fusing a mixture of silica, tinted with green or greenish colouring material, with hydrated or anhydrous oxide of glucinium and with alumina together with substances to act as flux, subsequently breaking or dividing up the fused mass obtained into fragments of determined size and heating the fragments anew in order to soften them, and finally subjecting the softened fragments to moulding or compression for the transformation of their appearance.

JOSÉ FERRER RIERA.